(12) United States Patent
Kayser

(10) Patent No.: US 6,333,602 B1
(45) Date of Patent: Dec. 25, 2001

(54) SMART LIGHT SOURCE WITH INTEGRATED OPERATIONAL PARAMETERS DATA STORAGE CAPABILITY

(75) Inventor: Roy Kayser, Etobicoke (CA)

(73) Assignee: EXFO Photonic Solutions Inc., Mississauga (CA)

( * ) Notice: Subject to any disclaimer, the term of this patent is extended or adjusted under 35 U.S.C. 154(b) by 0 days.

(21) Appl. No.: 09/459,989

(22) Filed: Dec. 14, 1999

(51) Int. Cl.[7] ........................................... G06K 7/10
(52) U.S. Cl. ........................... 315/117; 315/112; 315/292
(58) Field of Search .................... 315/117, 112, 315/291, 224, 225, 307, 360, 292, 115; 362/294

(56) References Cited

U.S. PATENT DOCUMENTS

| | | | |
|---|---|---|---|
| 4,509,508 | | 4/1985 | Tsukaya ................................. 128/6 |
| 4,533,854 | * | 8/1985 | Northrup .............................. 315/115 |
| 4,760,609 | * | 7/1988 | Tamagaki ............................. 315/117 |
| 5,150,154 | * | 9/1992 | Kuwabara ............................ 362/294 |
| 5,541,490 | | 7/1996 | Sengupta et al. ...................... 320/14 |
| 5,561,361 | | 10/1996 | Sengupta et al. ..................... 320/14 |
| 5,652,502 | | 7/1997 | van Phuoc et al. ................... 320/30 |

OTHER PUBLICATIONS

*System Extension Data Book*, pp. 788–801, ©1995–1996 by Dallas Semiconductor Corporation.

Tech Brief No. 1—*MicroLAN Design Guide* by Dan Awtrey, dated Feb. 7, 1999, http://www.dalsemi.com/TechBriefs/tb1.html.

* cited by examiner

*Primary Examiner*—David Vu
*Assistant Examiner*—Wilson Lee
(74) *Attorney, Agent, or Firm*—Bereskin & Parr

(57) ABSTRACT

A light source having a light generator, a sensor for sensing operational parameters of the light generator, and a light source data storage device integrated with the light generator and operatively coupled to the sensor, for storing operating data correlated to the operational parameters of the light emitter. The light source also typically has a light source housing, to which are mounted the light generator, the sensor and the light source data storage device.

6 Claims, 11 Drawing Sheets

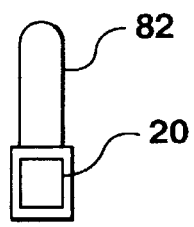
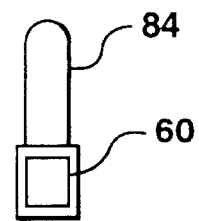
FIG. 1E    FIG. 1F
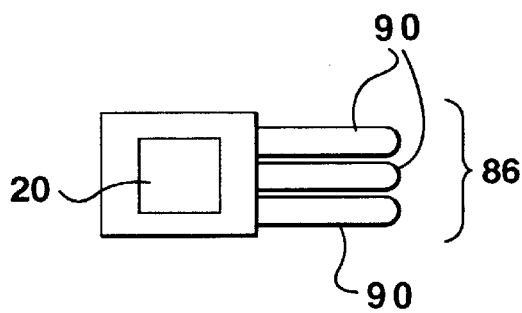
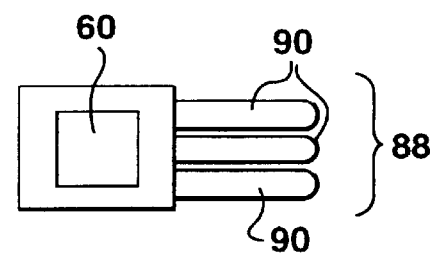
FIG. 1G    FIG. 1H
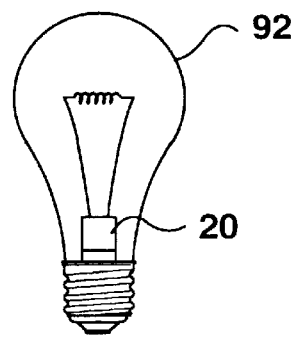
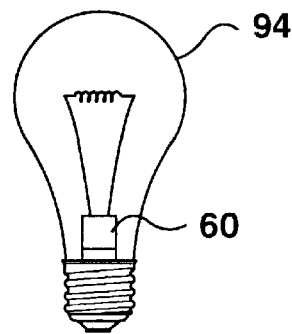
FIG. 1I    FIG. 1J

FIG. 1K  FIG. 1L

SMART LIGHT SOURCE WITH INTEGRATED OPERATIONAL PARAMETERS DATA STORAGE CAPABILITY

FIELD OF THE INVENTION

This invention relates to the field of light emitting devices, and in particular, to replaceable bulbs, lamps and other light emitters.

BACKGROUND OF THE INVENTION

Specialized light emitting devices, such as those used in photocuring applications, frequently utilize replaceable light sources which have been designed to emit light within specified parameters, under certain standard operating conditions. Such light sources are typically engineered to rigid standards, and as such are expensive to manufacture and purchase.

These types of light sources also frequently possess a limited operational lifespan in which the generated light meets acceptable parameters. This lifespan can be shortened by operating the light emitter under non-optimal conditions. The quality of the generated light can also be affected by operating under less than ideal operating conditions.

For example, in the context of an arc lamp, the operating temperature of the anode and cathode can affect the qualities of the light emitted, as well as the lamp's operational lifespan. Similarly, the temperature of the lamp at the time of striking (or restriking) of the lamp can also affect the lamp's performance.

The performance, including lifespan, of specialized light emitters is typically guaranteed by the manufacturer. Because such emitters tend to be expensive, occasionally they are returned to the manufacturer with a request for a free replacement or other consideration on the basis that the emitter failed to perform within specified parameters for its guaranteed lifespan. Such claims are generally impossible to verify by the manufacturer, since the manufacturer cannot confirm either the number of operating hours the emitter has undergone, or whether the conditions under which the light source was operated conformed to specifications.

Similarly, different emitters having different output capabilities may be used interchangeably within the same device, for different applications. When emitters are interchanged for different applications and stored for later use, it can be difficult for a user to ascertain how many operating hours a particular emitter has performed, and hence to predict its remaining useful operational life.

There is accordingly a need for a light source which stores operational data correlated to its operational life. In addition, the inventor(s) have recognized a need for apparatus which retrieves and displays the stored operational data from the light source.

SUMMARY OF THE INVENTION

The present invention is directed towards a light source, for use in a light emitting device, which stores operational data correlated to its operational life.

The subject light source comprises a light generator, a sensor for sensing operational parameters of the light generator, and a light source data storage device integrated with the light generator and operatively coupled to the sensor, for storing operating data correlated to the operational parameters of the light emitter. The light source also typically has a light source housing, to which are mounted the light generator, the sensor and the light source data storage device.

The subject invention is also directed towards a light emitting device in combination with the light source. The light emitting device includes a device housing, and a socket for releasably engaging the light source, the socket being mounted to the device housing. The light emitting device also has a controller operatively coupled to the socket, the controller comprising means for retrieving the operating data from the light source data storage device. Additionally, the light emitting device has a power source mounted to the device housing and operatively coupled to the controller.

Additionally, the subject invention is directed towards a light source for use in a light emitting device having a controller for determining operational parameters of the light source. The light source has a housing and a light generator mounted within the housing. The light source also has a light source data storage device mounted to the housing and adapted to operatively couple to the controller, for receiving and storing operating data from the controller correlated to the operational parameters of the light source.

The subject invention is further directed towards a light source reader in combination with the light source. The light source reader has a reader housing, a socket for releasably engaging the light source, wherein the socket is mounted to the reader housing, a controller operatively coupled to the socket, the controller comprising means for retrieving the operating data from the light source data storage device. The reader also has a power source mounted to the reader housing and operatively coupled to the controller.

BRIEF DESCRIPTION OF THE DRAWINGS

The present invention will now be described, by way of example only, with reference to the following drawings, in which like reference numerals refer to like parts and in which:

FIGS. 1E–1N are side views of further alternate embodiments of a light source made in accordance with the present invention.

DETAILED DESCRIPTION OF THE PREFERRED EMBODIMENTS

Figure 1A:
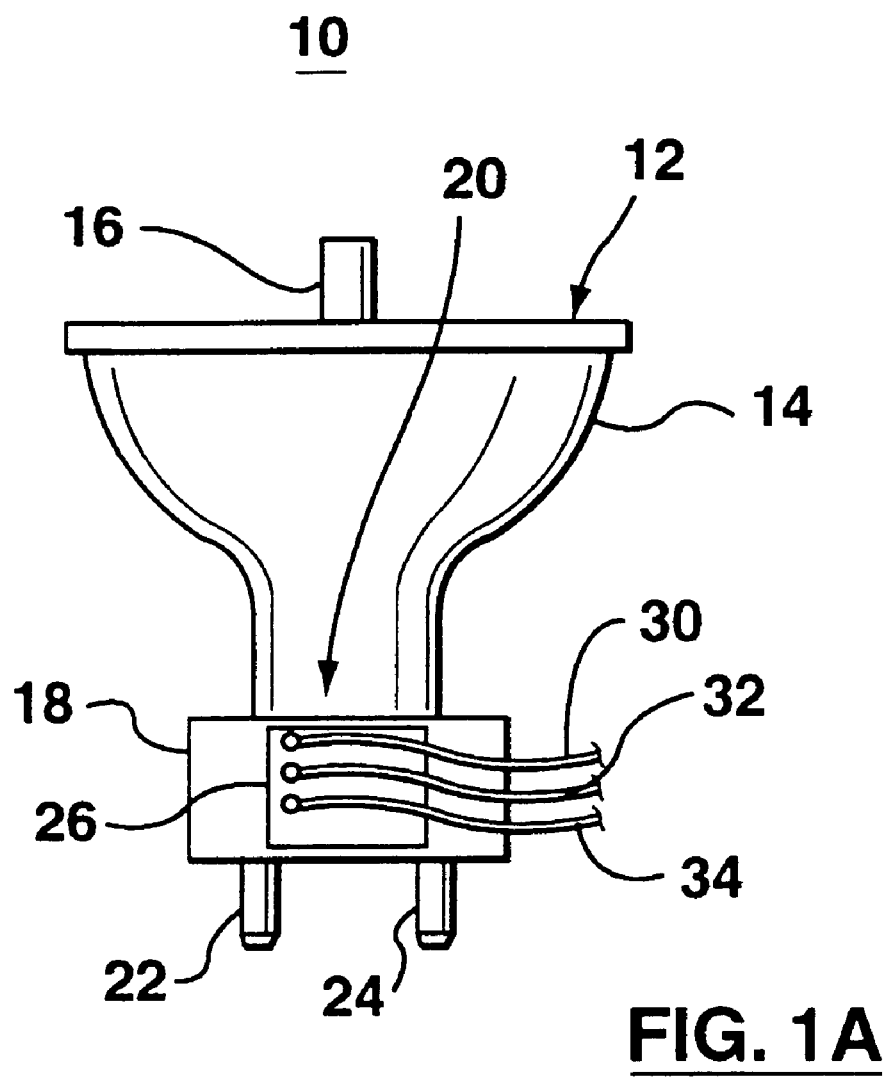
FIG. 1A is a side view of a light source made in accordance with the present invention.

Referring to FIG. 1A, illustrated therein is a first embodiment of the light source of the subject invention. The light source, in this case an arc lamp, shown generally as 10, comprises a light source housing 12, a reflector 14 (preferably parabolic in shape), a lamp 16, a ceramic lamp base 18, and a light source data storage device 20. As will be understood by one skilled in the art, the lamp 16 comprises an anode 22 and a cathode 24.

Figure 1B:
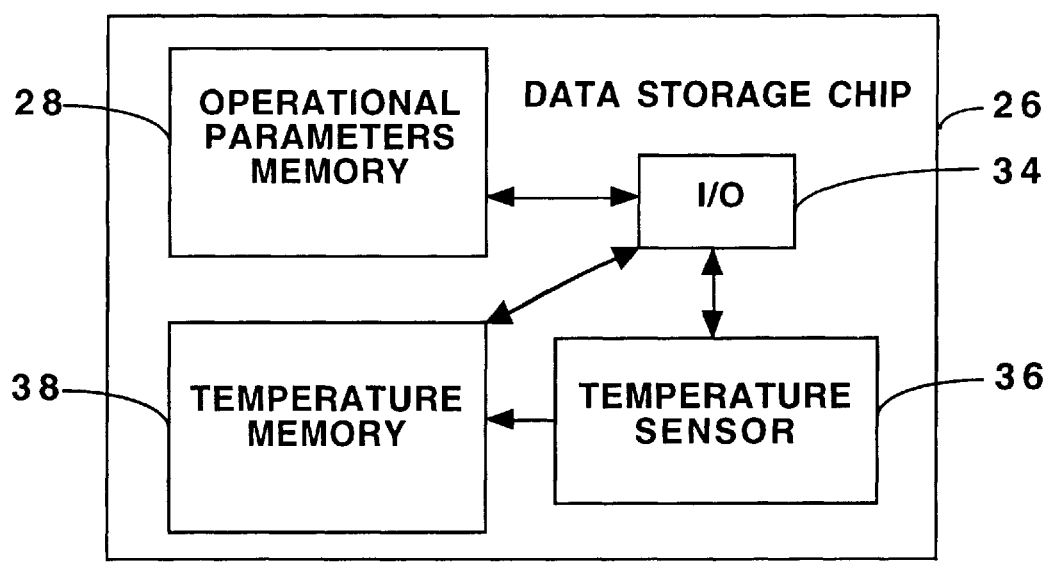
FIG. 1B is a schematic diagram of the storage device of FIG. 1A.

Referring simultaneously to FIGS. 1A and 1B, the light source data storage device 20 (frequently a circuit board), typically comprises an integrated circuit chip 26 having non-volatile, writable data storage capabilities, such as the EEPROM (electrically erasable programmable read-only memory) programmable digital thermostat chip no. DS1821S, manufactured by Dallas Semiconductor Corporation. Chip 26 has non-volatile data storage operational parameters memory 28, which will continue to store data even when power is not supplied to the chip 26. In the case of the DS1821S chip, the available memory for operational parameters storage purposes is limited to 16 bits of storage, originally intended to store data relating to maximum and minimum temperature values. The chip 26 only has a single pin for inputting and outputting data, and utilizes a one-wire communications protocol, as will be understood by one skilled in the art.

Figure 1C:
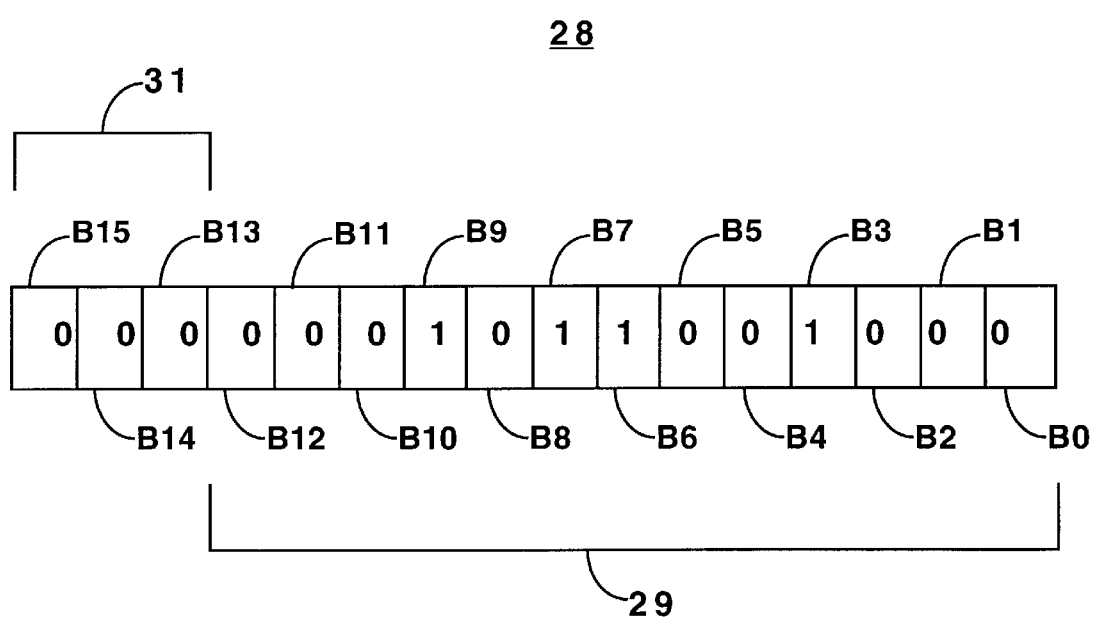
FIG. 1C is a schematic diagram of the bit allocation of the non-volatile operational parameters memory of the storage device of FIG. 1B.

As shown in FIG. 1C, the thirteen lowest order bits B0–B12 of the operational parameters memory 28 are used to store run-time data 29 (in binary) correlated to the number of run-time hours the light source 10 has been energized to emit light energy. Thirteen bits are able to represent values ranging from 0 to 9191, in binary. However, arc lamps and other light sources are typically only rated to operate within specified parameters for approximately one thousand to four thousand hours. Accordingly, as will be understood by one skilled in the art, for greater run-time accuracy, the value of the run-time data may directly correlate to the number of fifteen minute or half hour intervals of run-time operation, as appropriate.

The three highest order bits B13–B15 are reserved as condition flags 31, each of which is originally set to '0' during manufacturing of the chip 26, as will be understood by one skilled in the art. Maximum temperature bit B13 is set to '1' if the maximum operating temperature of the light source 10 has been exceeded during operation. Premature termination bit B14 is set to '1' if the light source 10 is energized to emit light energy for less than two minutes before the light source 10 is deenergized. Light source failure bit B15 is set to '1' if the light source 10 shuts off prematurely during a light generation period, which may occur for example as a result of a voltage spike from the power supply. The storage device 20 is preferably mounted to the light source housing 12, typically through the use of a high temperature, thermally conductive adhesive compound on the lamp base 18. The storage device 20 also comprises power 30, ground 32 and data input/output 34 leads.

The storage device 20 also comprises a sensor 36 for sensing the lamp's 16 temperature, as well as temperature memory 38 for storing data correlated to the sensed temperature.

For clarity of understanding, it should be understood that reference to a "light generation period" is intended to mean the period of time from the point at which energy is supplied to the lamp 16 energizing it and causing it to generate light energy, to the point at which the supply of power to the lamp 16 is terminated.

Figure 1D:
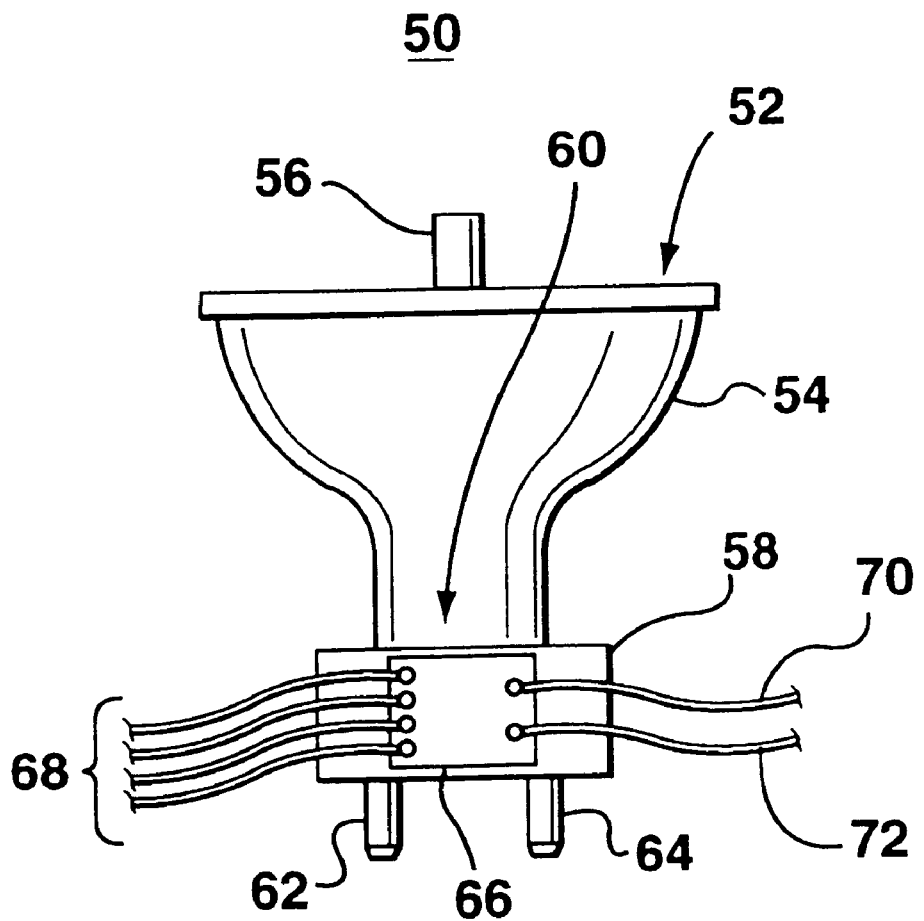
FIG. 1D is a side view of an alternate embodiment of a light source made in accordance with the present invention.
Figure 1M:
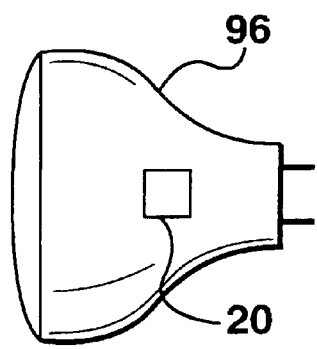
Figure 1M:
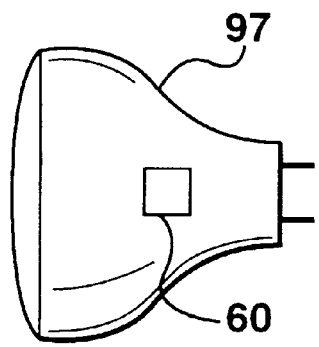
Figure 1M:
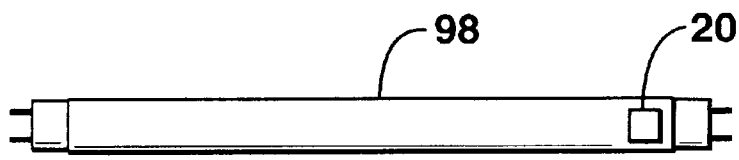

FIG. 1D shows an alternative embodiment of the light source, shown generally as 50. The light source 50 (an arc lamp), comprises a light source housing 52, a reflector 54 (preferably parabolic in shape), a lamp 56, a ceramic lamp base 58, a light source data storage device 60, and an anode 62 and cathode 64.

The light source data storage device 60 comprises a non-volatile RAM (random access memory) chip 66 (or similar non-volatile writable memory) which may typically possess at least 1K (kilobyte) of addressable memory. With such an extensive quantity of data storage available, the data storage device 60 is capable of storing more detailed information with respect to the operating parameters of the light source 50, than the data storage device 20 of FIG. 1A. Additionally, the data storage device 60 also comprises multiple I/O (input/output) leads 68, as well as power 70 and ground 72 leads.

Data storage 60 preferably stores such operational parameters such as the number of light generation periods the light source 50 has undergone, as well as the duration of each generation period, the total amount of time of all the generation periods (also referred to herein as the total run-time), and the light source's 50 temperature at the commencement of each generation period, as well as the light source's 50 temperature over time (if sufficient memory is available). Additionally, the data storage 60 will preferably store data relating to the operation of the light source 50 outside of specified parameters. Such data preferably includes the number of light generation periods during which the temperature of the light source 50 exceeded the maximum operating temperature. Additionally, such data will preferably include the number of occasions on which the lamp 56 was struck (or restruck) when the temperature of the lamp 56 exceeded specified parameters for striking or restriking (if the controller of the light emitting device used with the light source is not programmed to prevent such occurrences), the number of light generation periods that were less than two minutes in duration, the number of times the lamp 56 failed to strike when energized (if any), and the number of times that the lamp 56 self-extinguished or shut off prematurely during a light generation period (which may occur for example as a result of a voltage spike from the power supply).

It should be understood that while light sources 10, 50 of the first and alternative embodiments are illustrated and described as being arc lamps, other types of light sources could be used for different types of applications, and which are subject to the current invention. Such light sources may include light emitting semiconductors (such as LEDs), incandescent light bulbs, halogen bulbs, and fluorescent bulbs (either singly or in groups).

While it is anticipated that typically only replaceable light sources which are relatively expensive to purchase (and replace) will be used in the current invention, it should be understood that any type of light source in which it is important to monitor and store data correlating to the operational parameters of the light source may be used and is intended to be included in the present invention. Furthermore, the use of the term "light source" herein is not intended to be limited to generators of visible light-generators of infrared and ultraviolet radiation are also intended to be included within the scope of "light source".

Figure 1N:
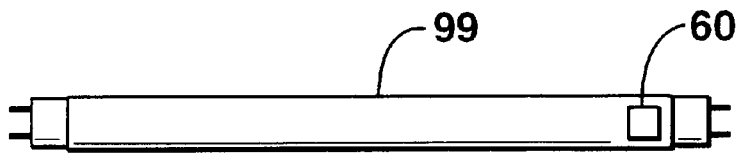

Illustrated in FIGS. 1E–1N are side views of further alternate embodiments of a light source made in accordance with the present invention. Such further alternate embodiments include a single LED 82 (FIG. 1E) or 84 (FIG. 1F), an array 86 (FIG. 1G) or 88 (FIG. 1H) of LEDs 90, an incandescent light bulb 92 (FIG. 1I) or 94 (FIG. 1J), a halogen bulb 96 (FIG. 1K) or 97 (FIG. 1L) or a fluorescent bulb 98 (FIG. 1M) or 99 (FIG. 1N). Such alternative embodiments include a storage device 20 or 60, similar to the storage devices 20, 60 of FIGS. 1A and 1C.

Figure 2A:
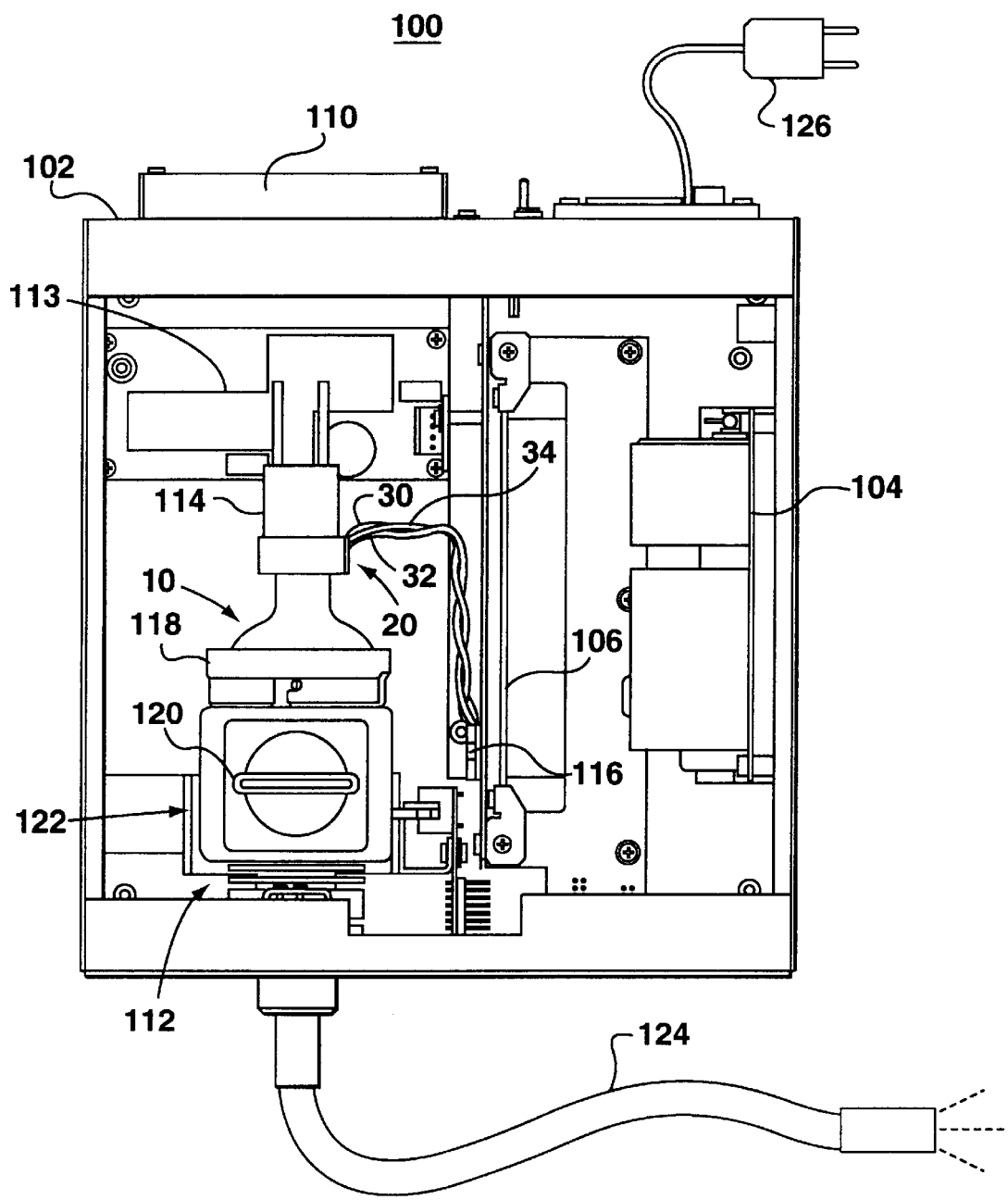
FIG. 2A is a top perspective view of a light emitting device made in accordance with the present invention, with the top cover removed and having the light source of FIG. 1A operationally mounted within it.
Figure 2B:
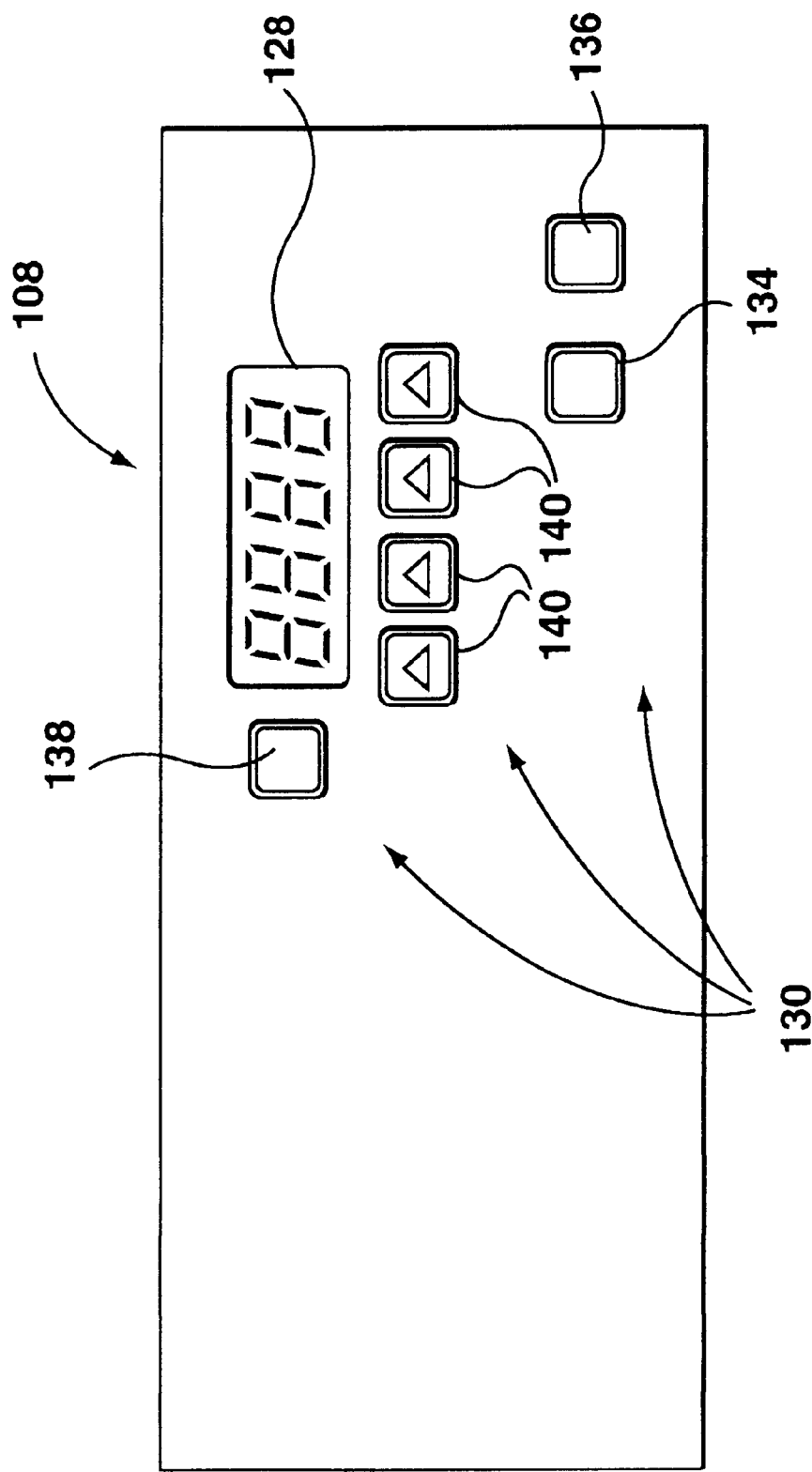
FIG. 2B is a front view of the control data interface of the device of FIG. 2A.
Figure 2C:
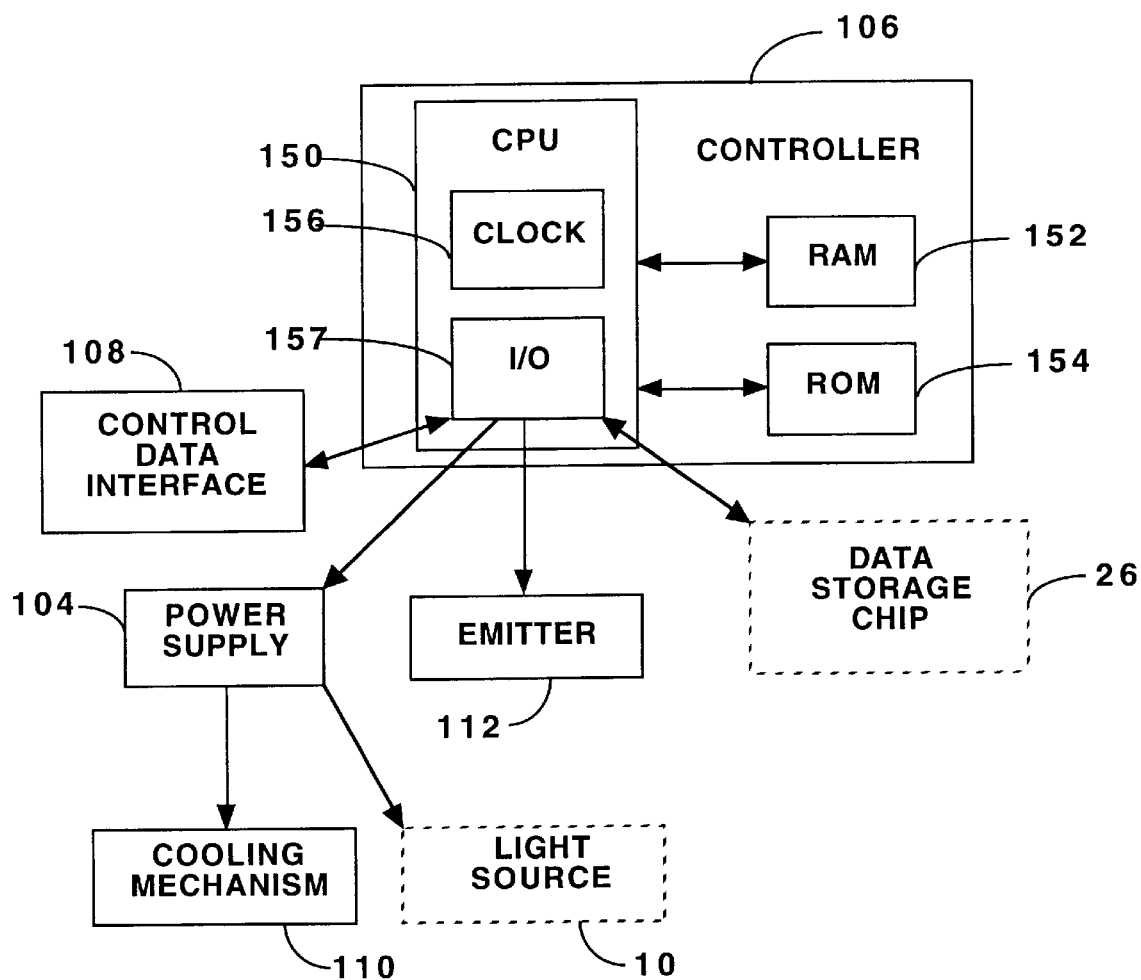
FIG. 2C is a schematic diagram of the controller from the light emitting device of FIG. 2A.

Referring now to FIGS. 2A, 2B and 2C, illustrated therein is a light emitting device, shown generally as 100, with the light source 10, operationally coupled to the device 100. Light emitting device 100 is generally similar to standard industrial light curing devices, such as that shown and described in U.S. Pat. No. 5,521,392, issued to Kennedy et al., with differences which are apparent from the discussion below.

Light emitting device 100 comprises a device housing 102, a power supply 104, a controller 106, a control data interface 108, a cooling mechanism 110, and an emitter 112.

The light source 10 is removably mounted within the light emitting device 100. The light source 10 is mounted to the light emitter 112 using a socket 114 adapted to receive the light source 10, and the anode 22 and cathode 24 pins (not visible) are operatively coupled to a lamp ballast 113 (which receives power from the power supply 104). In addition, the power 30, ground 32 and the data 34 leads are operatively connected to the controller 106 via an electrical connector 116. As will be understood, the controller 106 converts power supplied by the power supply 104 to a voltage level which the chip 26 requires to operate.

As will be also understood by one skilled in the art, the emitter 112 has a clamp 118 or similar means for mounting the light source 10 in proper optical alignment with the emitter 112. The emitter 112 also includes a bandpass filter 120, a shutter mechanism 122, and a light guide 124.

The power supply 104 may include an electrical cord 126 for connection to a standard electrical outlet, or other means such as a battery capable of providing sufficient electrical energy, in such manner as would be understood by one skilled in the art. Power supply 104 carefully regulates the power supplied to the light source 10 and to the cooling mechanism 110, in accordance with control signals from the controller 106, as described in greater detail, below. As will be understood, the power supplied to the light source 10 is preferably independent from the power supplied to the cooling mechanism 110.

As shown in FIG. 2B, the control data interface 108 preferably comprises a display 128 and an input panel 130. As will be understood in the art, the display 128 will typically be an LCD (liquid crystal display) or LED (light emitting diode) panel capable of displaying alphanumeric data to the user, and the input panel 130 typically comprises a combination of command buttons, such as start/stop 134 (which initiates/terminates a light emitting period when light is emitted through the light guide 124), lamp power on/off 136 and display mode 138 (which selects the type of data to be displayed on the panel 130, such as current light source 10 temperature, total light source 10 run time hours, length of current light generation period, length of current light emitting period, etc.), as well as several soft keys 140, through which the user is able to input command signals to the controller 106 typically with respect to the nature and duration of a light emitting period(s). Similar types of control data interfaces are known in the art.

As should be understood, arc lamps similar to the light source 10 generate significant amounts of heat when energized. Additionally, arc lamps may be damaged by striking or restriking when the lamp is too hot. If a lamp is permitted to remain energized when its temperature becomes too high, the quality of the generated light may be affected, and the lamp may also suffer damage, thereby reducing its operational life.

Accordingly, the controller 106 (typically a circuit board) comprises a suitably programmed CPU (central processing unit) 150, including both RAM 152 and ROM 154. The controller 106 is operatively coupled to the power supply 104, both to draw power for the controller's 106 operation, and also to regulate the supply of power to the cooling mechanism 110 and to control the application of power to the light source 10, in order to optimize the operating conditions of the light source 10. As will be understood, the controller 106 is also operatively coupled to the control data interface 108, as well as the emitter 112.

The controller 106 is also operatively coupled to the data storage device 20 (when a light source 10 is mounted in the device 100, as shown by the dotted outline in FIG. 2C), and is programmed to download and update the run-time hours data 29 and the condition flags 31 stored in the operational parameters memory 28, as well as to download temperature data stored in the temperature memory 38 correlated to the sensed temperature of the light source 10.

The CPU 150 also comprises an input/output module 157 which coordinates the transfer of data and command signals between the controller 106 and the other components 104, 108 and 112 of the device 100, and is also programmed to utilize the one-wire communication protocol of the chip 26, to enable the transfer of data between the controller 106 and the data storage device 20.

As will be understood by one skilled in the art, the CPU 150 also comprises a clock mechanism 156 which enables the CPU 150 to track time. The CPU 150 is programmed to track the number of hours of a light generation period (in addition to the duration of a light emitting period). At the completion of a light generation period (or alternatively at some predetermined time interval), the CPU 150 downloads the data stored in bits B0–B15 of the operational parameters memory 28. As will be understood, the CPU 150 then masks out the three highest order bits B13–B15, and adds the number of hours in the completed light generation period (rounded to the nearest hour) to the number (of run-time hours) retrieved from bits B0–B12 of the operational parameters memory 28. Again, through the use of masking, the updated number of run-time hours is stored in bits B0–B12.

In the event that the controller 106 receives a command signal from the control data interface 108 (by the user) to initiate a generation period, the controller 106 downloads the temperature data from the temperature memory 38. The temperature data is then compared to previously stored data correlated to the maximum striking temperature for the light source 10. If the sensed temperature data exceeds the maximum striking temperature data (indicating that the lamp is too hot for striking), then the controller 106 will prevent the power supply 104 from supplying power to the light source 10.

Similarly, the controller 106 will preferably be programmed to prevent the power supply 104 from supplying power to the light source 10 if the number of run-time hours for the light source 10 stored in operational parameters memory 28 exceeds a predetermined optimal number, such as two thousand five hundred (2500) hours.

Once a light generation period has commenced, power is supplied to the light source 10, which begins to warm up. If the generation period is terminated before the light source 10 has sufficiently warmed up, the light source 10 may suffer damage. Accordingly, the controller 106 is preferably programmed to set premature termination bit B15 in the operational parameters memory 28 to '1' if a light generation period has been terminated less than two minutes before it commenced (ie. before the light source 10 has completely warmed up).

At all times, the CPU 150 continuously monitors the operation of the light source 10. The CPU 150 repeatedly downloads the sensed temperature of the light source 10 from the temperature memory 38. The temperature memory 38 is updated by the sensor 36, when the sensor 36 receives a command signal from the CPU 150 to do so. Alternatively, the sensor 36 may be configured to automatically update the temperature memory 38 on regular intervals.

During a light generation period, if the temperature data retrieved from the temperature memory 38 is greater than a predetermined maximum value (indicating that the light source 10 is operating at a temperature higher than a predetermined maximum level), the controller 106 generates a control signal to the power supply 104 to discontinue providing power to the light source 10, and thereby terminate the generation period. Such an automatic shutdown reduces the risk that the light source 10 might explode, and helps prevent extraordinary degradation of the operational life of the light source 10. The controller 106 is preferably programmed to then set maximum temperature bit B13 to '1'.

If the sensed temperature does not exceed the predetermined maximum level, the controller 106 multiplies the sensed temperature by a predetermined cooling mechanism voltage factor, to determine a cooling mechanism power voltage. The controller 106 then generates a command signal to the power supply 104 to supply power to the cooling mechanism 110 at a voltage correlated to the determined cooling mechanism power voltage. Accordingly, the supply of power to the cooling mechanism 110 varies directly with the sensed temperature of the light source 10. An increase in the amount of power to the cooling mechanism 110 (typically a fan), causes the cooling mechanism to circulate air, ventilating warmer air from inside the device housing 102 and drawing in cooler air from outside the housing 102, causing a corresponding decrease in the operating temperature of the light source 10. As the sensed temperature of the light source 10 decreases, the voltage supplied to the cooling mechanism 110 correspondingly decreases, as well.

Instead of terminating the power supplied to the light source 10 if the maximum temperature is exceeded, instead the CPU 150 may be programmed to issue a warning to the user about the excessive operating temperature via the control data interface 108—the user would then be able to make the decision whether or not to terminate the light generation period. If at any time the sensed temperature exceeds a predetermined maximum operating temperature, as noted, the CPU 150 appropriately flags this condition by setting bit B13 to "1", at the end of the generation period when the operational parameters memory 18 is updated.

The light emitting device 100 with the light source 10 is used in much the same manner as known light emitting devices (such as the device disclosed in U.S. Pat. No. 5,521,392, issued to Kennedy et al.). However, as will be understood by one skilled in the art, a user may review the data stored in the operational parameters memory 28 through the use of the control data interface 108. In most instances, the user will specifically be interested in determining the number of run-time hours that the light source 10 has undergone (stored in bits B0–B12 of the operational parameters memory 28), as well as the expected number of operational run-time hours remaining in the life of the light source 10. The user may also be interested in reviewing the sensed temperature data, stored in the temperature memory 38.

Figure 3:
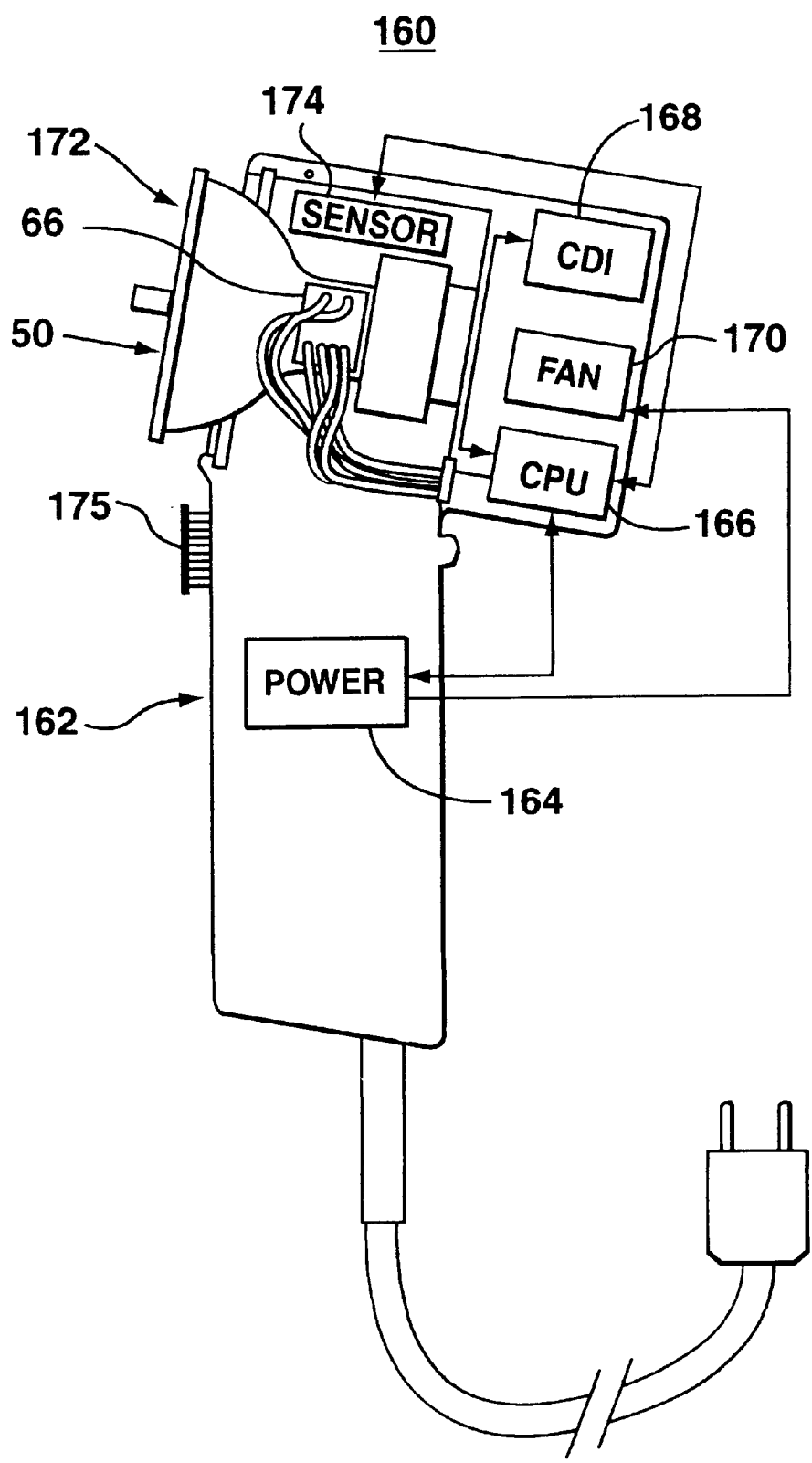
FIG. 3 is a schematic side view of a handheld light emitting device made in accordance with the present invention, in combination with the light source of FIG. 1D.

Referring now to FIG. 3, illustrated therein is a schematic side view of a hand held light emitting device, shown generally as 160, with the light source 50 operationally coupled to the device 160.

Light emitting device 160 comprises a device housing 162, a power supply 164, a controller 166, a control data interface 168, a cooling mechanism 170 (typically a fan), an emitter 172, and a light source temperature sensor 174.

Preferably, the controller 166, the control data interface 168, and the power supply 164 will be substantially similar to the controller 106, control data interface 108 and power supply 104 of the light emitting device 100 of FIG. 2A, although the control data interface 168 will likely be smaller in size. Additionally, the light emitting start/stop button 134 will typically be replaced by a trigger mechanism 175. The controller 166 also differs somewhat in that it has been programmed to download and store operational parameters data from and store updated data in addressable memory locations on the non-volatile RAM chip 62, as will be understood by one skilled in the art. Additionally, the controller 166 receives temperature data from the sensor 174, which is typically located proximate the mounted light source 50. The sensor 174 may be the digital thermostat chip no. DS1821S, manufactured by Dallas Semiconductor Corporation.

Figure 4:
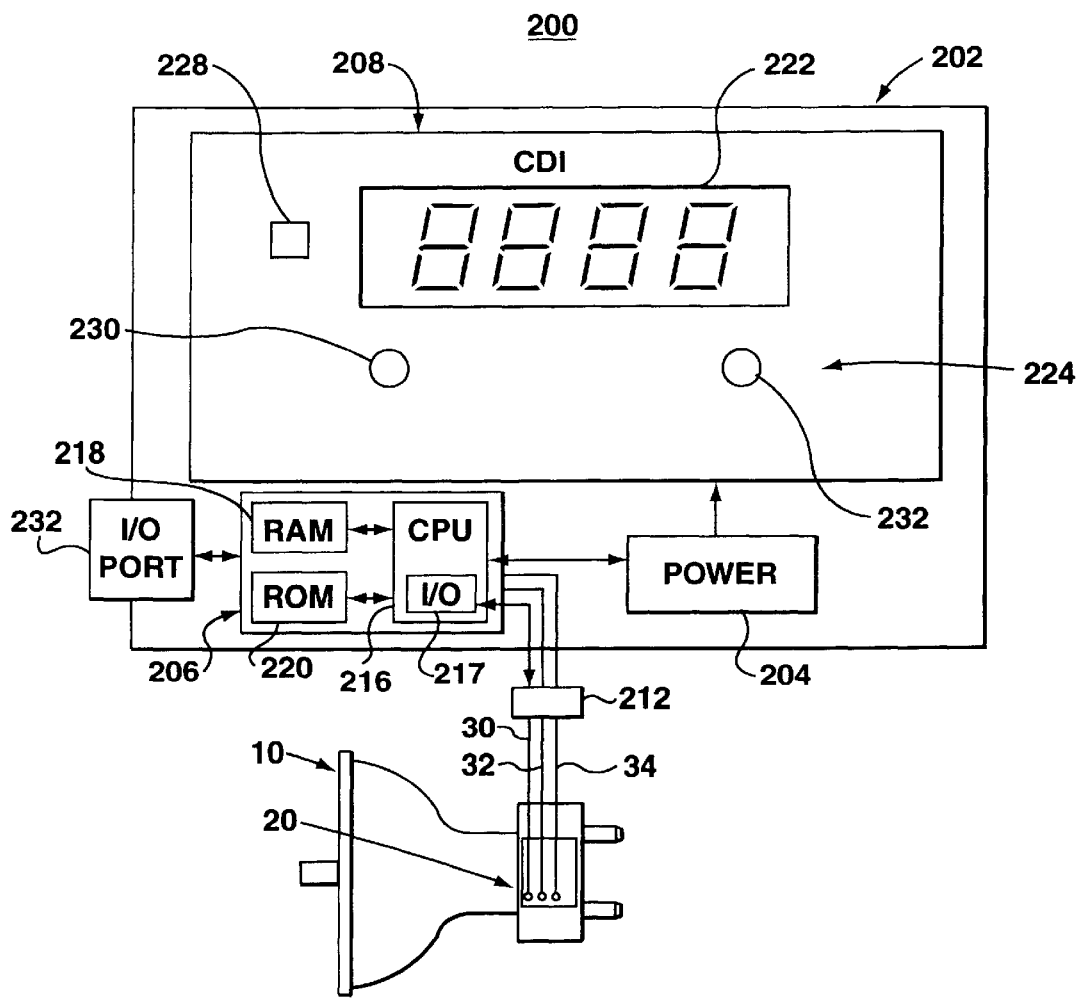
FIG. 4 is a schematic view of a reader made in accordance with the present invention, in combination with the light source of FIG. 1A.

Referring now to FIG. 4, illustrated therein is a schematic view of a reader device, shown generally as 200, to which a light source 10 has been operatively coupled. The reader device 200 includes a reader housing 202, a power supply 204, a controller 206 and a control data interface 208 mounted on the housing 202.

The light source 10 is removably coupled to the reader device 200. Power 30, ground 32 and data 34 leads are connected to the controller 206 via a releasable electrical connector 212 which is external to the housing 202. As will be understood, the controller 206 converts power supplied by the power supply 204 to a voltage level which the chip 26 requires to operate.

The controller 206 comprises a suitably programmed CPU 216, including both RAM 218 and ROM 220. As will be understood by one skilled in the art, the CPU 216 is programmed to retrieve selected operational parameter data stored in the operational parameters data storage 28, using one wire communications protocol. The CPU 216 also comprises an input/output module 217 which is programmed to utilize the one-wire communication protocol of the chip 26, to enable the transfer of data between the controller 206 and the data storage device 20.

While the controller 206 and power supply 204 are illustrated as being located in the housing 202, alternatively, it should be understood that with appropriate modifications the controller 206, and the power supply 204 may form part of a standard computer, to which the reader 200 is attached as an external device.

The control data interface 208 includes a display 222 and an input panel of command buttons 224. The display 222 will typically be an LCD or LED panel capable of displaying alphanumeric data to the user, and the command buttons 224 typically include display mode 228 (similar to the display mode button 138 of FIG. 2B), as well as reset 230 (to commence the transfer of data between the storage device 20 and the reader 200), and temperature 232 (which tests the temperature sensor 36 of the light source 10), through which the user is able to input command signals to the controller 206. The command signals are received by the controller 206, and used to select operational parameter data stored in the operational parameter memory 28 or alternately to obtain a temperature reading from the sensor 36, for display on the display 222.

Preferably, the controller also comprises a data I/O port 232, which may be connected to a remote computer. The operational parameters data may then be downloaded to the remote computer and stored in a database of operational parameter data from other light sources for statistical or other analyses.

In use, a light source, such as light source 10, is connected to the reader 200, in the manner illustrated and described in reference to FIG. 4. Through the appropriate inputting of commands by depressing command buttons 224 in accordance with the information displayed on the display 222, a user is able to review the light source's 10 operational parameter data stored in the operational parameters data storage. The user is then able to review the light source's 10 number of run-time hours, as well as whether any of the condition flags have been set indicating that the light source 10 has been abused, and also to test that the sensor 36 is working.

Thus, while what is shown and described herein constitute preferred embodiments of the subject invention, it should be understood that various changes can be made without departing from the subject invention, the scope of which is defined in the appended claims.

I claim:

1. A light emitting device in combination with a light source, the light source comprising:

(a) a light generator;

(b) a sensor for sensing operational parameters of the light generator;

(c) a light source data storage device integrated with the light generator and operatively coupled to the sensor, for storing operational parameters data correlated to the operational parameters of the light generator; and (d) a light source connector adapted to operatively couple the light source to a light emitting device;

wherein the light emitting device comprises:

(e) a device housing;

(f) a socket adapted to releasably engage the light source connector, wherein the socket is mounted to the device housing;

(g) a controller for retrieving the operational parameters data from the light source data storage device; wherein the controller is operatively coupled to the socket; and (h) a power source mounted to the device housing and operatively coupled to the controller and to the socket.

2. The light emitting device of claim 1, wherein the power source comprises means for selectively providing power to the light source to cause the light generator to generate light energy in accordance with control signals generated by the controller.

3. The light emitting device of claim 1 further comprising a cooling mechanism operatively coupled to the power source, wherein the power source comprises means for selectively providing power to the cooling mechanism to reduce the temperature of the light source in accordance with control signals generated by the controller.

4. The light emitting device of claim 1, further comprising a display operatively coupled to the controller for selectively displaying image data correlated to selected operational data.

5. The light emitting device of claim 1, further comprising a control data interface.

6. The light emitting device of claim 1, further comprising a light emitter adapted to emit light generated by the light source when the light source is energized to generate light energy.

* * * * *